United States Patent [19]

Krueger et al.

[11] Patent Number: 5,197,079
[45] Date of Patent: Mar. 23, 1993

[54] HIGH-POWER STRIPLINE LASER

[75] Inventors: Hans Krieger, Munich; Walter Kirschner, Unterfoehring, both of Fed. Rep. of Germany

[73] Assignee: Siemens Aktiengesellschaft, Munich, Fed. Rep. of Germany

[21] Appl. No.: 749,692

[22] Filed: Aug. 26, 1991

[30] Foreign Application Priority Data

Sep. 26, 1990 [DE] Fed. Rep. of Germany ....... 4030441

[51] Int. Cl.$^5$ ............................................. H01S 3/097
[52] U.S. Cl. .......................................... 372/87; 372/82
[58] Field of Search .................................... 372/82, 87

[56] References Cited

U.S. PATENT DOCUMENTS

| 4,713,825 | 12/1987 | Adsett | 372/107 |
| 4,723,255 | 2/1988 | Cohn et al. | 372/87 |
| 4,805,072 | 2/1989 | Ackermann et al. | 372/82 |
| 4,876,693 | 10/1989 | Lucero et al. | 372/82 |
| 4,930,137 | 5/1990 | Sergoyan et al. | 372/87 |
| 4,939,738 | 7/1990 | Opower | 372/95 |

Primary Examiner—John D. Lee
Assistant Examiner—Robert E. Wise
Attorney, Agent, or Firm—Hill, Steadman & Simpson

[57] ABSTRACT

High-power stripline laser. In a high-power stripline laser, a high beam quality and mode purity is achieved in that the mutual spacing of two electrodes that form waveguide surfaces for the laser emission and limit a discharge space are adjustable in a longitudinal direction and in a transverse direction of the discharge space and the metal spring is set to a desired value. The invention is suitable for high-power stripline lasers having high beam quality.

13 Claims, 2 Drawing Sheets

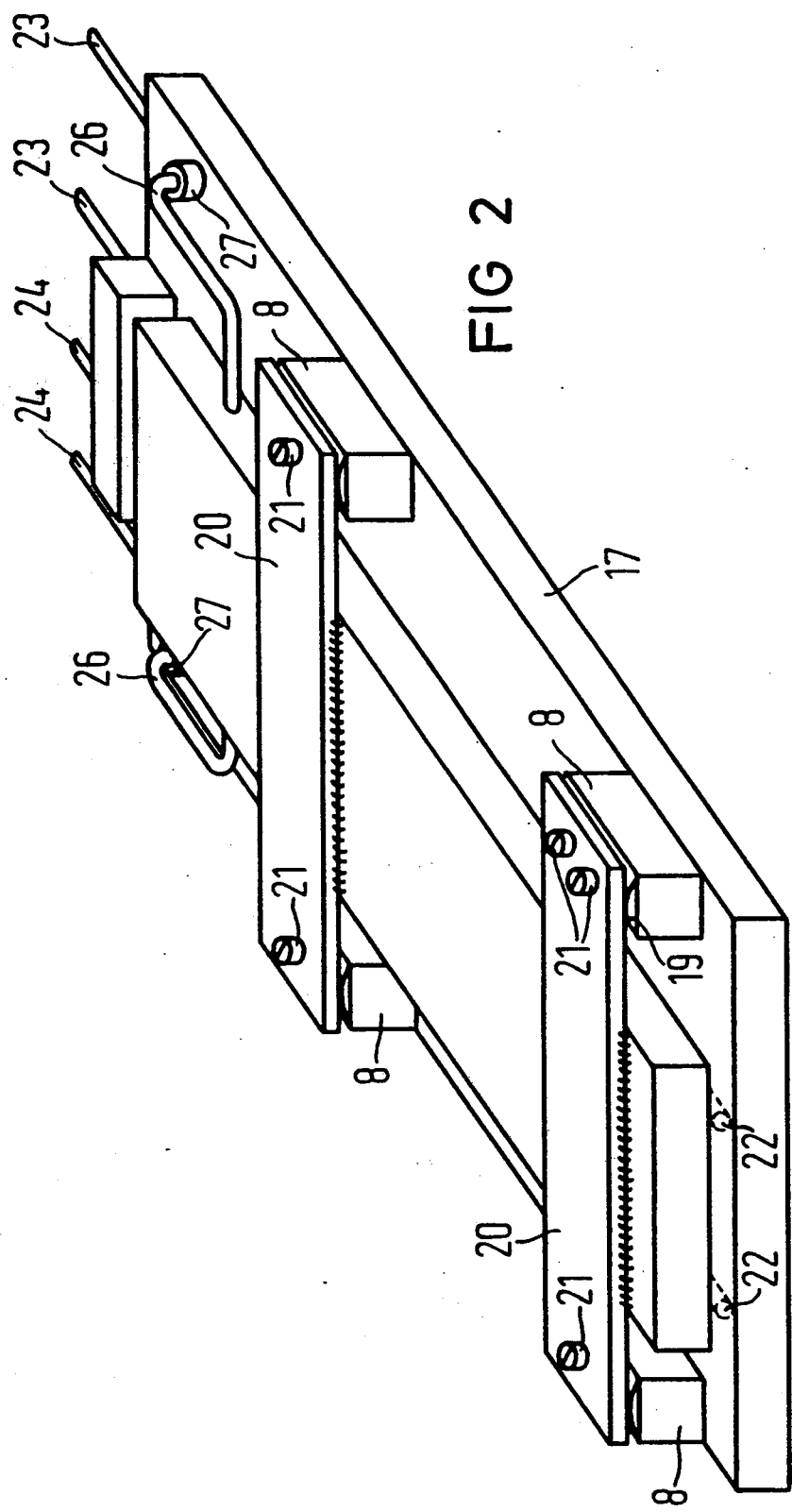

HIGH-POWER STRIPLINE LASER

BACKGROUND OF THE INVENTION

The present invention is directed to a high-power stripline laser. Such a laser is disclosed by German Published Application 37 29 053 (corresponding to U.S. Pat. No. 4,939,738).

SUMMARY OF THE INVENTION

The beam quality, i.e. the mode purity of the laser, has been shown to be substantially dependent on the mutual spacing of the waveguide surfaces. Accordingly, it is an object of the present invention to improve the beam quality of a high-power stripline laser and to enhance the mode purity. The present invention is a high-power stripline laser that contains two metal electrodes between which a discharge gap is formed. The electrodes have waveguide surfaces facing toward the discharge gap, whereby resonator mirrors of an unstable resonator immediately adjoin one of the electrodes. The spacings of the electrodes in a longitudinal direction and in a transverse direction of the discharge space are adjustable and are set to a desired value. The unstable resonator can thereby be formed by mirrors whose spacing is kept constant, as disclosed in U.S. Pat. No. 4,713,825 (hereby incorporated by reference), by rods having an extremely low coefficient of thermal expansion, for example of "Invar".

A less involved execution is established when the resonator mirrors are adjusted and fixed to an electrode. In this embodiment, no adjustment devices for the mirrors are required at the laser since the mirrors are exposed before being built in and can therefore be adjusted with re-employable devices.

An arrangement of the present invention that makes it possible to set the mutual spacing of the electrodes with extremely high precision has the features that the resonator mirrors are fixed to a first electrode and are adjusted relative thereto, that a second electrode is arranged between the resonator mirrors, leaving insulating distances free, that a housing is composed of two end plates, at least three metal rods arranged between these and an outside wall joined vacuum-tight to the end plates, that the metal rods all have the same coefficient of thermal expansion and define the spacing between the end plates, that the first electrode is rigidly connected to a first end plate and is movable in axial direction vis-a-vis a second end plate but is guided in a radial direction, and that at least one end plate contains an exit window for the laser emission. This structure guarantees a temperature distribution in the laser housing that is not externally influenced and, via the metal rods that define the spacing between the end plates, thus guarantees a constant, mutual position of the two end plates. On the basis of an appropriate dimensioning, the metal rods define the spacings of the end plates regardless of temperature differences and stresses involved therewith in the correspondingly more weakly dimensioned outside wall of the housing.

In addition, temperature differences that appear in the inside of the housing from time to time, for example when starting the laser up to a temperature equilibrium in the interior, are also rendered harmless in that the spacer rods are composed of a material having an extremely low coefficient of thermal expansion, for example of the material known under the trademark "Invar". Slighter tiltings of the electrode as a consequence of different expansion are thus also voided in the heat-up phase, the laser beam maintains its direction and the beam exit window remains in the desired angular position relative to the discharge space and relative to the electrodes.

An electrode arrangement adjustable with adequate precision is established in that electrically insulating supporting elements are mechanically and rigidly joined to the first electrode, in that mounts for the second electrode are arranged adjustable in a direction perpendicular to the first electrode with these supporting elements, and in that the second electrode is mechanically and rigidly joined to these mounts. The mounts are thereby advantageously formed of metal bands, whereby the second electrode is soldered or welded to these metal bands, whereby compression springs are arranged between the mounts and the supporting elements and whereby one or more screws hold the mounts in the desired position opposite the spring pressure.

Cooling channels are usually required in such arrangements. It is thereby advantageous when both electrodes contain cooling channels, when coolant connections are applied only in the lower, first electrode that is electrically connected to ground, and when a respective electrically insulating and a respective elastic connecting line is connected between the first and the second electrode for admission and discharge, the elasticity of this connecting line guaranteeing that the second electrode is adequately mobile for the adjustment and is not inadmissibly bent by the spring power during adjustment.

The connecting lines, for example, can be composed of metal tubes and of electrically insulating ceramic sleeves, whereby the ceramic sleeves, for example, can be soldered onto the first electrode.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 is a perspective view of the electrode arrangement of a stripline laser of the present invention, whereby one mirror is removed.

DESCRIPTION OF THE PREFERRED EMBODIMENT

Figure 1:
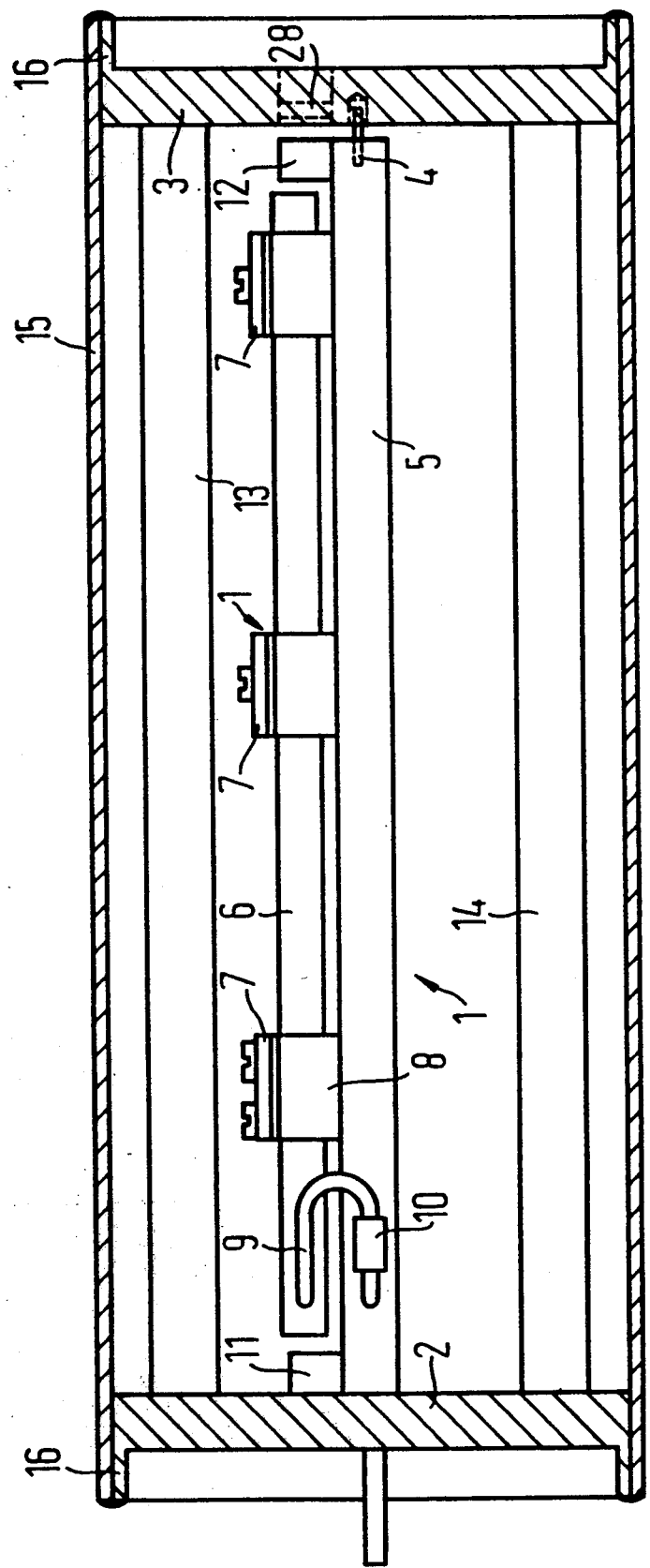
FIG. 1 is a cross-sectional view of an arrangement of the present invention, whereby the front wall of the housing is removed.

An electrode arrangement 1 of a high-power stripline laser is mechanically and rigidly connected to an end plate 2 of a vacuum-tight housing and is movable in an axial direction vis-a-vis an end plate 3 and guided in a radial direction. The guidance and radial direction, for example, occurs with one or more fit pins 4 that proceed from an electrode 5 of the electrode arrangement into a recess of the second end plate 3.

The second electrode 6 is carried by the first electrode 5 in that holders 7 are screwed to spacers 8. A connecting line 9 that contains an insulating ceramic piece 10 elastically joins the two electrodes 5 and 6 so that an adjustment of the second electrode 6 vis-a-vis the first electrode 5 is possible without resulting in an inadmissible deformation of the electrodes. Mirrors 11 and 12 are likewise secured to the first electrode 5 and adjusted vis-a-vis the first electrode 5. A beam exit window 28 that forms a part of the vacuum-tight housing is located following the mirror 12 in the beam direction.

The present exemplary embodiment contains four spacer rods 13 and 14, whereby two spacer rods respectively lie behind one another in the drawing. The cross section of the housing in the present example is rectangular, however, it can also advantageously be round. Other embodiments are also possible. The holding rods 13 and 14 are mechanically and rigidly joined to the end plates 2 and 3, for example they can be screwed, soldered or welded, and are dimensioned such that they define the spacing of the end plates. The housing wall 15 is fashioned comparatively thin and is soldered or welded vacuum-tight to connector elements 16 of the end walls 2 or, respectively, 3 that are likewise fashioned relatively thin.

In the example of FIG. 1, the second electrode 6 is connected to the first electrode 5 by three holders 7. As a result thereof, even slight bendings of the electrodes can be avoided or compensated.

An advantageously adjustable embodiment is shown in FIG. 2. Spacers 8 therein are secured to a first electrode 17, whereby the spacers 8 are composed of insulating material, particularly ceramic. Leaf springs 19 that press against holders 20 are arranged on these spacers 8. The holders 20 are mechanically and rigidly joined to the second electrode 18, for example they can be welded or soldered. Adjustment screws 21 that are preferably screws having a fine thread enable an extremely exact adjustment of the mutual spacing and of the mutual, lateral tilt of the electrodes. To this end, high-precision spacers, for example, trimming needles 22 are pushed between the electrodes and the electrodes are then adjusted for contact. One adjustment screw per spacer 8 thereby usually suffices; two adjustment screws can also be utilized for protection.

A convex mirror 25 and coolant admissions 23 and coolant discharges 24 for the two electrodes are depicted in FIG. 2 at the further end of the electrode arrangement. The coolant admissions 23 are thereby positioned at one side and the coolant discharges 24 are positioned at the other side of the symmetry plane of the electrode arrangement. This yields an especially stress-free configuration even given high power of the laser. Connecting lines 26 are connected to the first electrode 17 via ceramic rings 27 and are directly connected to the second electrode 18, so that the two electrodes are insulated from one another. The connecting lines 26 are adequately elastic so that they do not deteriorate the adjustment of the electrode 18 vis-a-vis the electrode 17.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A high-power stripline laser having two metal electrodes between which a discharge gap is formed, the electrodes having waveguide surfaces facing toward the discharge gap, and resonator mirrors of an unstable resonator immediately adjoining one electrode of the two metal electrodes, comprising: the two electrodes forming an electrode assembly; and means for adjusting the position of the electrode assembly in a longitudinal direction and in a transverse direction of the discharge gap and for setting the position to a desired value.

2. The high-power stripline laser according to claim 1, wherein the resonator mirrors are fixed to a first electrode of the two metal electrodes and are adjusted vis-a-vis said first electrode; wherein a second electrode of the two metal electrodes is arranged between the resonator mirrors, leaving insulating strips free; wherein a housing is composed of two end plates, of at least three spacer rods arranged therebetween and of an outside wall that joins the end plates vacuum-tight; wherein the spacer rods all have the same coefficient of thermal expansion and define the spacings of the end plates; wherein the first electrode is rigidly joined to a first end plate of the two end plates and is movable in an axial direction vis-a-vis a second end plate of the two end plates but is guided in a radial direction; and wherein at least one end plate of the two end plates contains an exit window for the laser emission.

3. The high-power stripline laser according to claim 2, wherein the spacer rods are composed of a material having an extremely low coefficient of thermal expansion.

4. The high-power stripline laser according to claim 1, wherein electrically insulating spacers are mechanically and rigidly joined to the first electrode; wherein holders for the second electrode are arranged adjustable in a direction perpendicular to the first electrode with the insulating spacers; and wherein the second electrode is mechanically and rigidly joined to the holders.

5. The high-power stripline laser according to claim 4, wherein the holders are metal bands; wherein the second electrode is soldered to the metal bands; wherein compression springs are arranged between the holders and the spacers; and wherein at least one screw for each of the holders holds the holders in the desired position opposite the spring power of the respective compression spring.

6. The high-power stripline laser according claim 1, wherein each of the two metal electrodes contains cooling channels; wherein coolant connections are attached only to the first electrode; and wherein electrically insulating and elastic connecting lines are respectively connected between the first and the second electrodes for admission and discharge of a coolant, the elasticity of the connecting lines guaranteeing that the second electrode is movable for the adjustment and is not substantially bent during adjustment.

7. A high-power stripline laser having two metal electrodes between which a discharge gap is formed, the electrodes having waveguide surfaces facing toward the discharge gap, and resonator mirrors of an unstable resonator immediately adjoining one electrode of the two metal electrodes, comprising: the resonator mirrors fixed to a first electrode of the two metal electrodes and adjusted vis-a-vis said first electrode; a second electrode of the two metal electrodes arranged between the resonator mirrors, leaving insulating strips free; a housing composed of two end plates, of at least three spacer rods arranged therebetween and of an outside wall that joins the end plates vacuum-tight, the spacer rods all having the same coefficient of thermal expansion and defining the spacings of the end plates, the first electrode being rigidly joined to a first end plate of the two end plates and being movable in an axial direction vis-a-vis a second end plate of the two end plates but being guided in a radial direction; at least one end plate of the two end plates containing an exit window for laser emission; electrically insulating spacers mechanically and rigidly joined to the first electrode; holders for the second electrode arranged adjustable in a direction perpendicular to the first electrode with the insulating spacers; the second electrode mechanically and rigidly joined to the holders that are metal bands, the second electrode being soldered to the metal bands; compression springs arranged between the holders and the spacers; and at least one screw for each of the holders holding the holders in the desired position opposite the spring power of the respective compression spring.

8. The high-power stripline laser according to claim 7, wherein the spacer rods are composed of a material having an extremely low coefficient of thermal expansion.

9. The high-power stripline laser according claim 7, wherein each of the two metal electrodes contains cooling channels; wherein coolant connections are attached only to the first electrode; and wherein electrically insulating and elastic connecting lines are respectively connected between the first and the second electrodes for admission and discharge of a coolant, the elasticity of the connecting lines guaranteeing that the second electrode is adequately movable for the adjustment and is not inadmissibly bent due to the spring power of the compression springs during adjustment.

10. A high-power stripline laser having two metal electrodes between which a discharge gap is formed, the electrodes having waveguide surfaces facing toward the discharge gap, and resonator mirrors of an unstable resonator immediately adjoining one electrode of the two metal electrodes, comprising: the resonator mirrors fixed to a first electrode of the two metal electrodes and adjusted vis-a-vis said first electrode; a second electrode of the two metal electrodes arranged between the resonator mirrors, leaving insulating strips free; a housing composed of two end plates, of at least three spacer rods arranged therebetween and of an outside wall that joins the end plates vacuum-tight, the spacer rods all having the same coefficient of thermal expansion and defining the spacings of the end plates, the first electrode being rigidly joined to a first end plate of the two end plates and being movable in an axial direction vis-a-vis a second end plate of the two end plates but being guided in a radial direction; and at least one end plate of the two end plates containing an exit window for the laser emission; each of the two metal electrodes containing cooling channels; coolant connections attached only to the first electrode; electrically insulating and elastic connecting lines respectively connected between the first and the second electrodes for admission and discharge of a coolant, the elasticity of the connecting lines guaranteeing that the second electrode is movable for the adjustment and is not substantially bent during adjustment: and means for setting the spacing between the two metal electrodes to a desired value.

11. The high-power stripline laser according to claim 10, wherein the spacer rods are composed of a material having an extremely low coefficient of thermal expansion.

12. The high-power stripline laser according to claim 10, wherein electrically insulating spacers are mechanically and rigidly joined to the first electrode; wherein holders for the second electrode are arranged adjustable in a direction perpendicular to the first electrode with the insulating spacers; and wherein the second electrode is mechanically and rigidly joined to the holders.

13. The high-power stripline laser according to claim 12, wherein the holders are metal bands; wherein the second electrode is soldered to the metal bands; wherein compression springs are arranged between the holders and the spacers; and wherein at least one screw for each of the holders holds the holders in the desired position opposite the spring power of the respective compression spring.

* * * * *